United States Patent [19]
Würfel

[11] Patent Number: 5,915,490
[45] Date of Patent: Jun. 29, 1999

[54] MOTOR VEHICLE HAVING A FRONT-END RADIATOR ARRANGEMENT

[75] Inventor: Manfred Würfel, Leonberg, Germany

[73] Assignee: Dr. Ing. h.c.F. Porsche AG, Weissach, Germany

[21] Appl. No.: 08/786,933

[22] Filed: Jan. 23, 1997

[30] Foreign Application Priority Data

Jan. 23, 1996 [DE] Germany ............. 196 02 186

[51] Int. Cl.⁶ .................................................. B60K 11/04
[52] U.S. Cl. ............................... 180/68.1; 180/68.4
[58] Field of Search .................. 180/68.1, 68.3, 180/68.4, 68.6, 69.2, 69.21, 69.24

[56] References Cited

U.S. PATENT DOCUMENTS

| | | | |
|---|---|---|---|
| 4,516,650 | 5/1985 | Yamaguchi et al. | 180/68.3 |
| 4,566,407 | 1/1986 | Peter | 123/41.48 |
| 4,646,863 | 3/1987 | Yamada | 180/68.1 |
| 4,653,788 | 3/1987 | Di Giusto | 293/117 |
| 4,723,594 | 2/1988 | Koehr et al. | 165/44 |
| 4,805,747 | 2/1989 | Moedinger et al. | 188/264 |
| 5,141,068 | 8/1992 | Mendicino | 180/68.3 |
| 5,271,473 | 12/1993 | Ikeda et al. | 180/68.4 |
| 5,358,304 | 10/1994 | Kanemitsu et al. | 296/194 |
| 5,476,138 | 12/1995 | Iwasaki et al. | 165/41 |
| 5,529,743 | 6/1996 | Powell | 264/513 |
| 5,671,802 | 9/1997 | Rogers | 165/41 |

FOREIGN PATENT DOCUMENTS

| | | |
|---|---|---|
| 0 134 765 A1 | 3/1985 | European Pat. Off. . |
| 3338466A1 | 5/1985 | Germany . |
| 37 01 736 A1 | 8/1988 | Germany . |
| 195 27 442 A1 | 1/1997 | Germany . |
| 405096960 | 4/1993 | Japan ............ 180/68.1 |
| 1144429 | 3/1969 | United Kingdom . |

*Primary Examiner*—Lanna Mai
*Assistant Examiner*—Bridget Avery
*Attorney, Agent, or Firm*—Evenson, McKeown, Edwards & Lenahan, P.L.L.C.

[57] ABSTRACT

A motor vehicle has at least one front-end radiator which is connected by means of a duct-type air guiding housing to a front-side air supply opening of an elastic covering part forming the end area of the vehicle. In order to absorb the relative movement on the air guiding housing without any damage the relative movement occurring in the case of an impact shock on the forward covering part while the cooling air guiding is good and the mounting is simple, it is provided that the air guiding housing is fixedly connected with the radiator and interacts with the covering part disposed in front only by way of a loose sliding fit and that the air guiding housing is made in areas of an elastically deformable material.

10 Claims, 8 Drawing Sheets

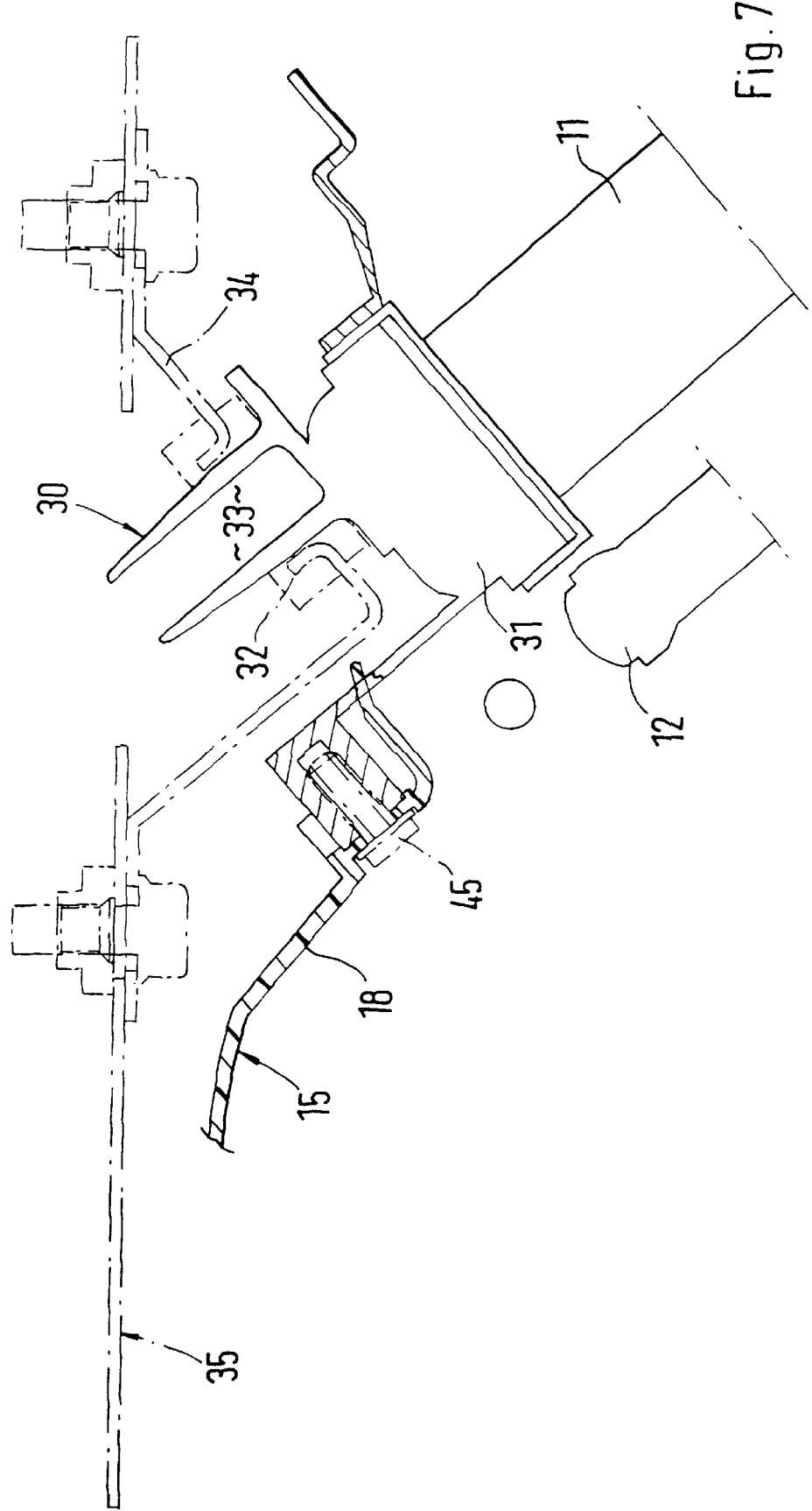

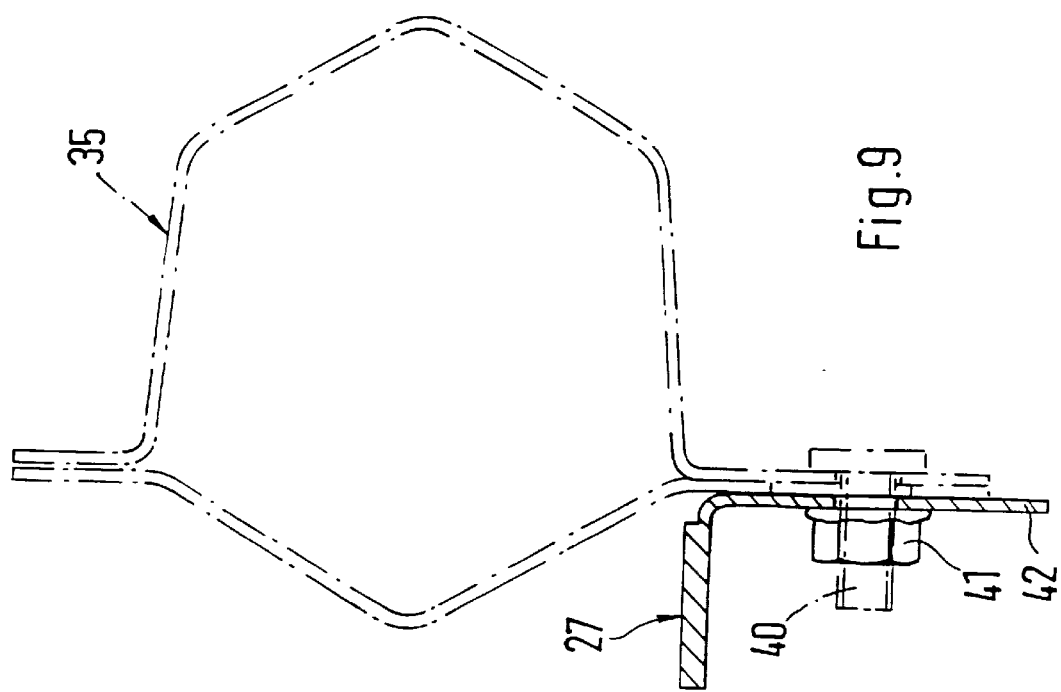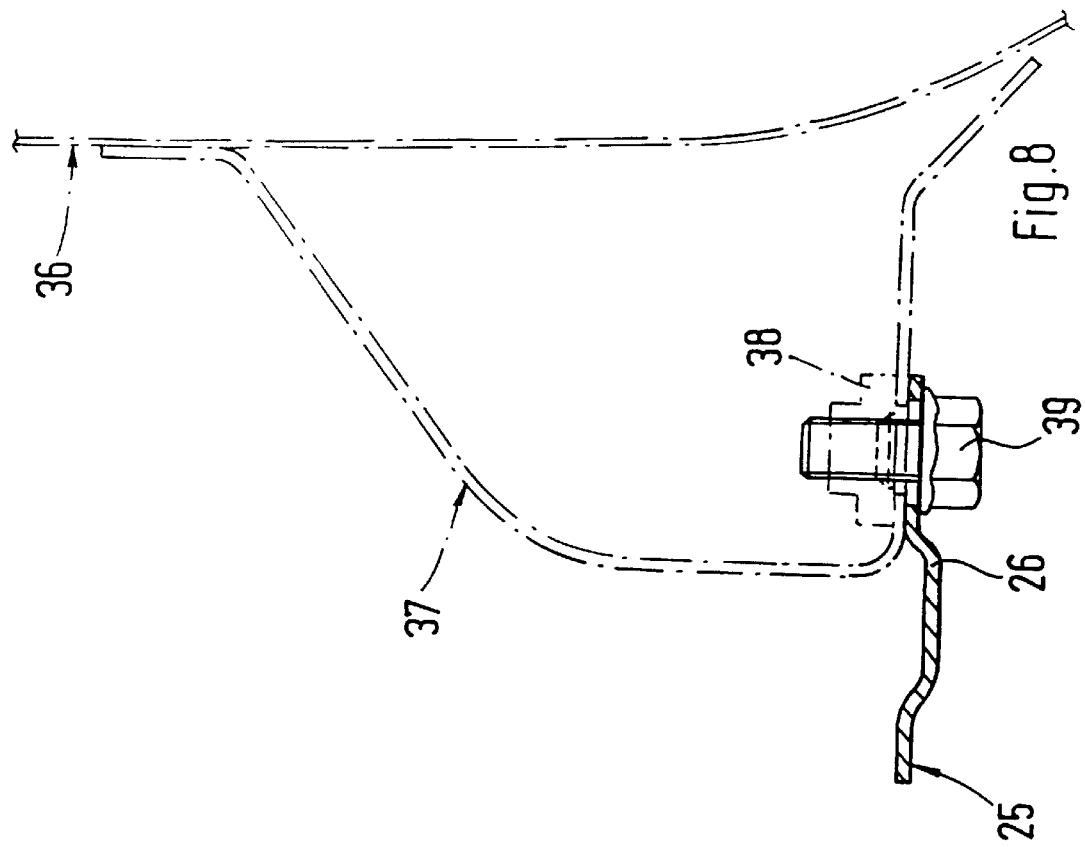

MOTOR VEHICLE HAVING A FRONT-END RADIATOR ARRANGEMENT

BACKGROUND AND SUMMARY OF THE INVENTION

This invention relates to a motor vehicle having a front-end radiator arrangement with a duct-type air guiding housing being arranged between a front-side air supply opening of an elastic covering part forming a vehicle end area and at least one radiator, which air guiding housing is connected to the covering part and the radiator.

German Patent Document DE 333 38 466 A1 discloses a front-end radiator arrangement for a motor vehicle in which case two radiators which being disposed above one another are arranged between the two laterally exterior side members, which radiators each being connected by way of a separate air guiding housing to an air supply opening of an elastic covering part forming the vehicle end area. The air guiding housing situated on the bottom is fixedly connected on its two ends by means of screwable fastening devices with the radiator, on the one hand, and with the covering part, on the other hand.

By means of its one end, the air guiding housing situated on top is fixedly connected with the radiator, whereas the other end projects into the hollow space of a bumper support. Both air guiding housings are constructed of a uniform, dimensionally stable plastic material. In the case of an impact shock onto the bumper, the elastic covering part and the bumper support move by a specific path toward the rear in the direction of the radiator and then, without damaging the covering part, return into their original position.

However, in the case of this arrangement, there is the risk that the air guiding housing formed of relatively hard dimensionally stable plastic material will not go along in the relative movement between the bumper and the body and that the air guiding housing is damaged during the relative movement.

It is an object of the invention to further develop an air guiding housing for a front-end radiator arrangement such that, while the guiding of the cooling air is good and the mounting is simple, the air guiding housing can absorb without any damage the relative movement onto the covering part occurring during an impact shock.

According to the invention, this object is achieved by an arrangement wherein the air guiding housing is fixedly connected to the radiator and interacts with the covering part situated in front only by way of a loose sliding fit, and wherein at least partial areas of the air guiding housing are made of an elastically deformable material which compensates the displacing movement.

A principal advantage achieved by means of the invention is that, as the result of the only fixed linking of the air guiding housing being at the radiator with a loose sliding fit between the air guiding housing and the covering part, a fast and simple mounting is achieved. A further principal advantage is achieved by the invention in that, as the result of the construction of the air guiding housing which is elastically deformable at least in sections, relative movements between the bumper and the vehicle body are compensated without any damage to the air guiding housing.

Preferably, the plastic air guiding housing is manufactured in a two-component construction, with the partial area which faces the covering part being made of an elastically deformable plastic material, whereas the partial area facing the radiator is made of a dimensionally stable plastic material.

In the case of an impact shock of up to approximately 8 km/h onto the forward bumper, this bumper will slide by approximately 80 to 120 mm toward the rear and the soft section of the air guiding housing will compensate the relative movement while forming a fold, in which case, when the bumper is returned into its original position, the fold will retract. As a result, no forces or only very low forces are transmitted to the radiator.

Although the invention has been described and illustrated in detail, it is to be clearly understood that the same is by way of illustration and example, and is not to be taken by way of limitation. The spirit and scope of the present invention are to be limited only by the terms of the appended claims.

BRIEF DESCRIPTION OF THE DRAWINGS

FIG. 7 is a sectional view of the fastening of the prefabricated constructional radiator-bracket unit on the forward side member;

FIG. 8 is an enlarged sectional view of the fastening of the bracket on the support of the spare wheel well; and FIG. 9 is an enlarged sectional view of the fastening of the bracket on the side member.

DETAILED DESCRIPTION OF THE DRAWINGS

Figure 1:
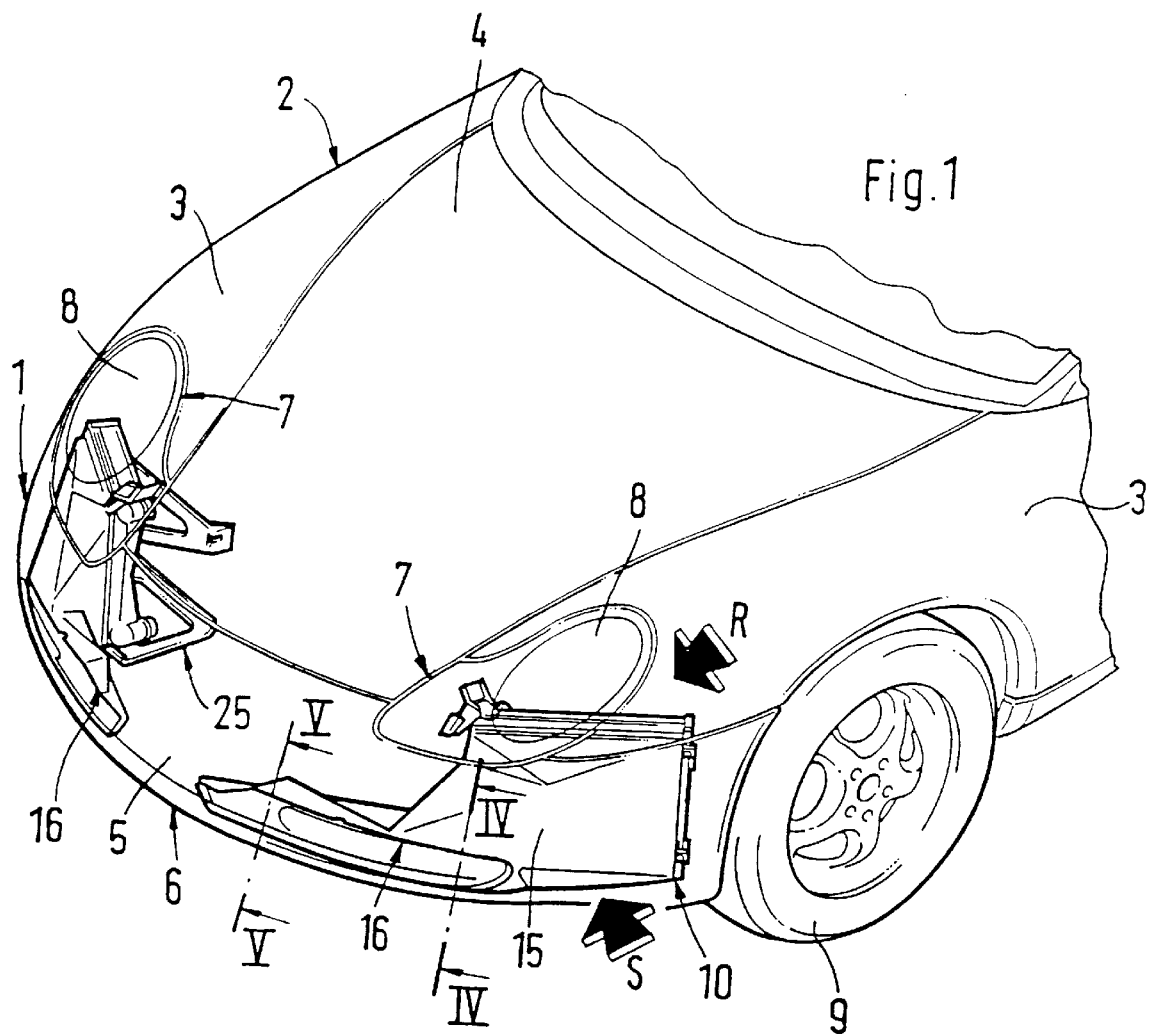
FIG. 1 is a perspective partial view diagonally from the front of a front-end area of a motor vehicle having a radiator arrangement constructed according to a preferred embodiment of the present invention.

The front-end area 1 of a motor vehicle formed as a passenger car illustrated in FIG. 1 comprises a vehicle body 2 which is composed essentially of two laterally exterior fenders 3, a swivellable forward hood 4 situated in-between, and an elastic covering part 5 forming the end area of the passenger car. Together with a support, which is situated behind it, is supported on the vehicle body side and is not shown in detail, the covering part 5 forms a forward bumper 6. Headlight units 8 are inserted into recesses 7 of the fenders 3. The covering part 5, which is preferably constructed of an elastic plastic material, extends laterally to the adjoining front wheels 9.

In front of each front wheel 9, a radiator arrangement 10 is provided which is composed of at least one radiator 11, 12, of a fan 14 carried by a frame 13 and of an air guiding housing 15. In the top view, the upright radiator 11 extends diagonally from the forward interior to the rearward exterior.

The frame 13 which accommodates the fan 14 is fixedly connected with the rear side of the radiator 11. In the embodiment shown, the radiator 11 is used for cooling an internal-combustion engine which is not shown. Another radiator 12 can be connected in front of the radiator 11 and is formed, for example, as an air-conditioning condenser.

The radiator 12 has a lower height than the radiator 11 situated behind it. For the defined feeding of cooling air, a large-volume, duct-shaped air guiding housing 15 is provided which extends between the air supply openings 16 of the covering part 5 and the radiator 11, 12.

The air guiding housing 15 is constructed of plastic material and is detachably connected with the radiator 11 by means of fastening screws 45. The air guiding housing 15 is built in a two-component construction in such a manner that the section 18 facing the radiator 11 consists of a relatively hard plastic material (such as PPT 40), whereas the area 19 facing the covering part 5 consists of a relatively soft, elastic, deformable plastic material (such as PTE).

Figure 5:
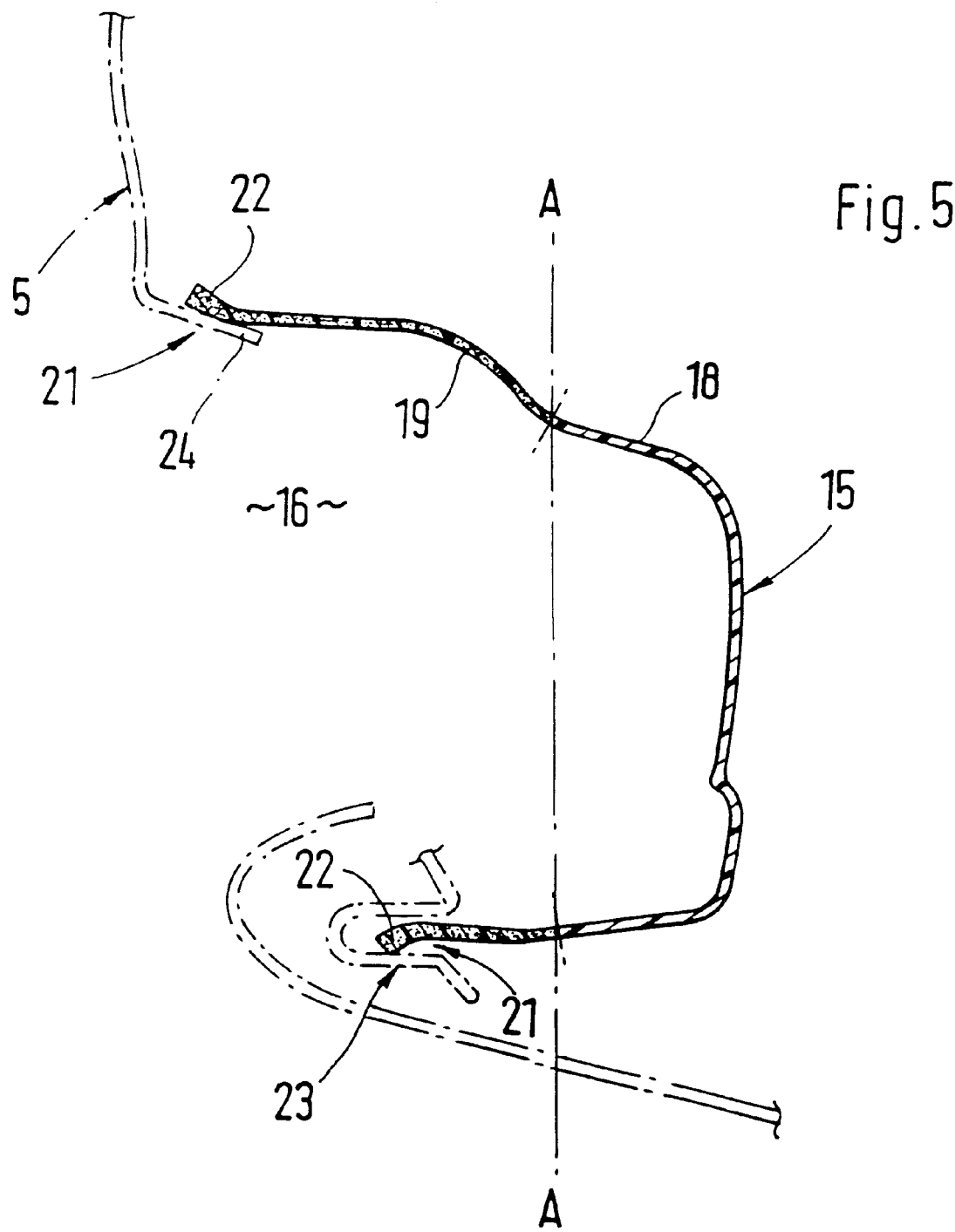
FIG. 5 is an enlarged sectional view taken along Line V—V of FIG. 1.
Figure 6:
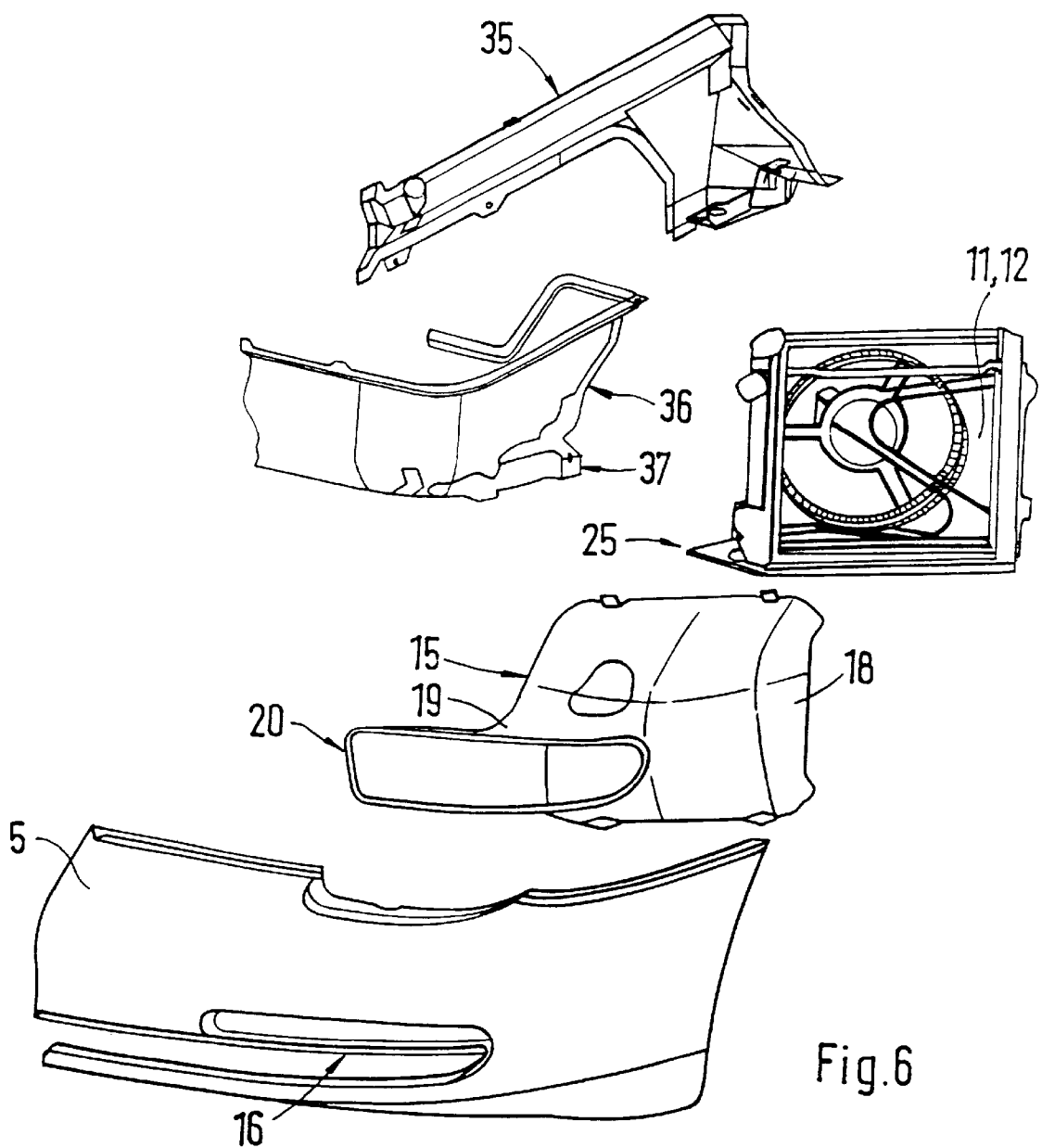
FIG. 6 is an exploded view of the components of the radiator arrangement and the adjoining vehicle body.

According to FIG. 5, the hard/soft separation extends in the area of an upright plane A—A.

The ring-shaped edge section 20 of the air guiding housing facing the covering part 5 is situated lower than the bumper support and is connected with the covering part 5 only by way of a loose sliding fit 21.

In a partial area of the circumference of the air supply opening 16, the sliding fit 21 is formed in that a free end 22 of the air guiding housing 15 engages in a U-shaped receiving section 23 of the covering part 5 (FIG. 5). For compensating tolerances in the longitudinal direction, the receiving section 23 has a larger longitudinal dimension than the inserted edge section 20.

In another partial area of the circumference of the air supply opening 16, the free end 22 of the air guiding housing 15 rests under prestress on the exterior side of an edge-shaped flange 24 of the air supply opening 16 (FIG. 5).

By means of the hard/soft construction of the air guiding housing 15, in the case of an impact shock of up to approximately 8 km/h onto the covering part 5, only very low forces are transmitted to the radiator 11, and relative movements of the covering part 5 and of the air guiding housing 15 can be compensated without any damage to the air guiding housing 15.

In addition, as the result of the loose sliding fit 21 between the covering part 5 and the air guiding housing 15, relatively large tolerances can be compensated.

For the simple mounting of the radiators 11, 12 and the fan 14 with the frame 13 on the body 2, a bracket 25 is provided which is composed of an approximately horizontally extending bottom section 26 and an upright lateral wall 27.

Figure 2:
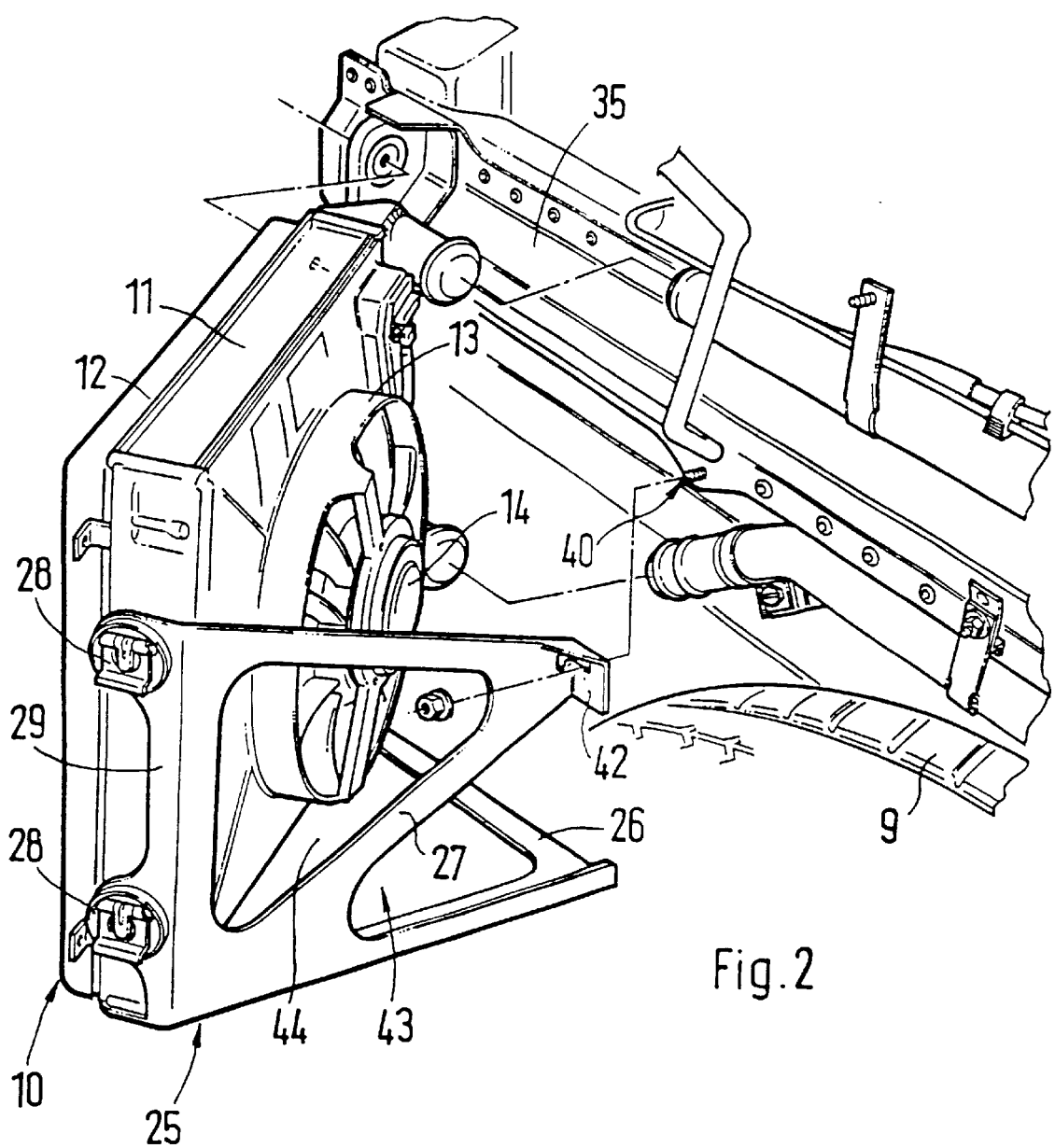
FIG. 2 is a schematic view in the direction of the arrow R of FIG. 1.
Figure 3:
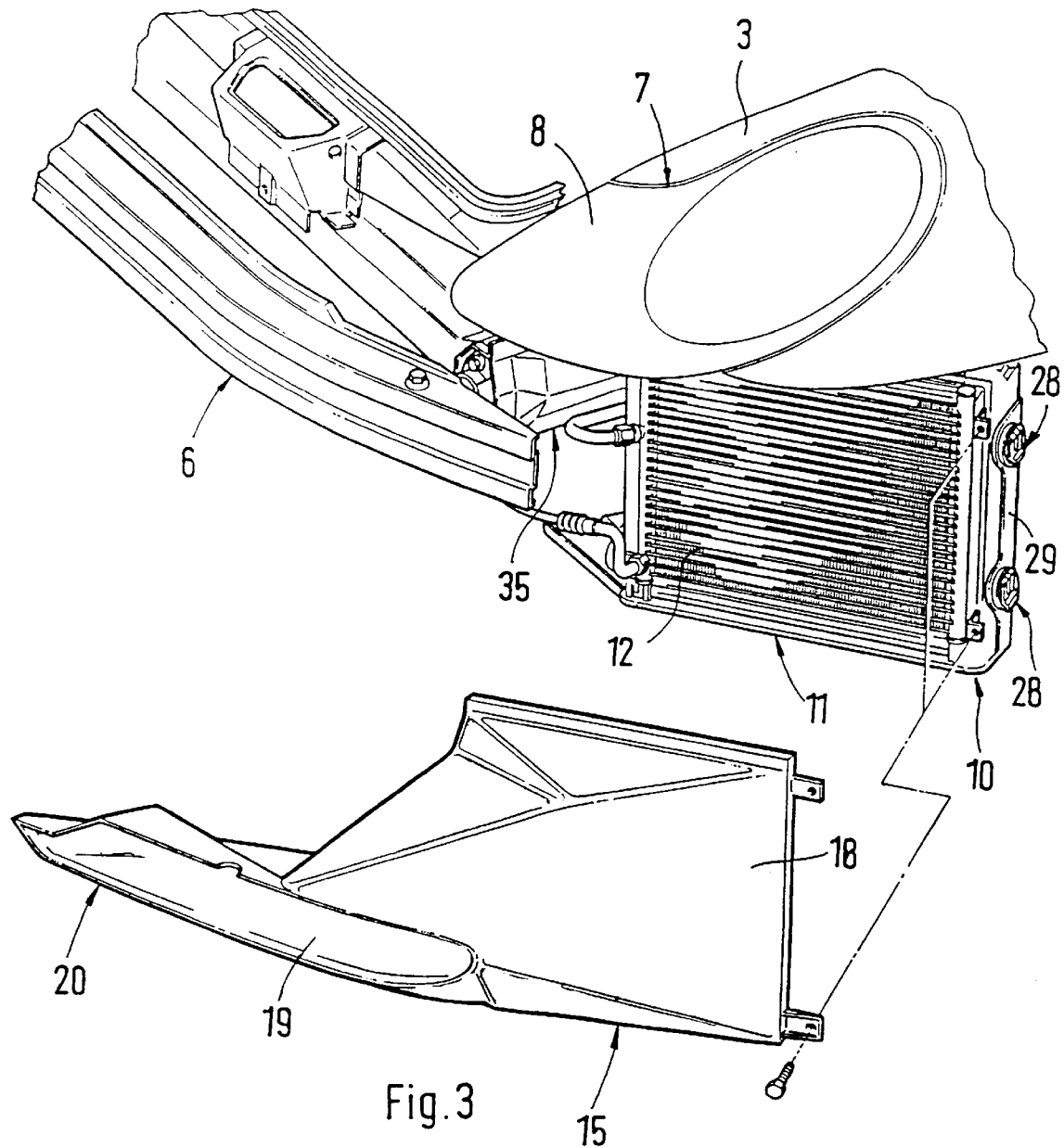
FIG. 3 is an exploded schematic view in the direction of the arrow S of FIG. 1.
Figure 4:
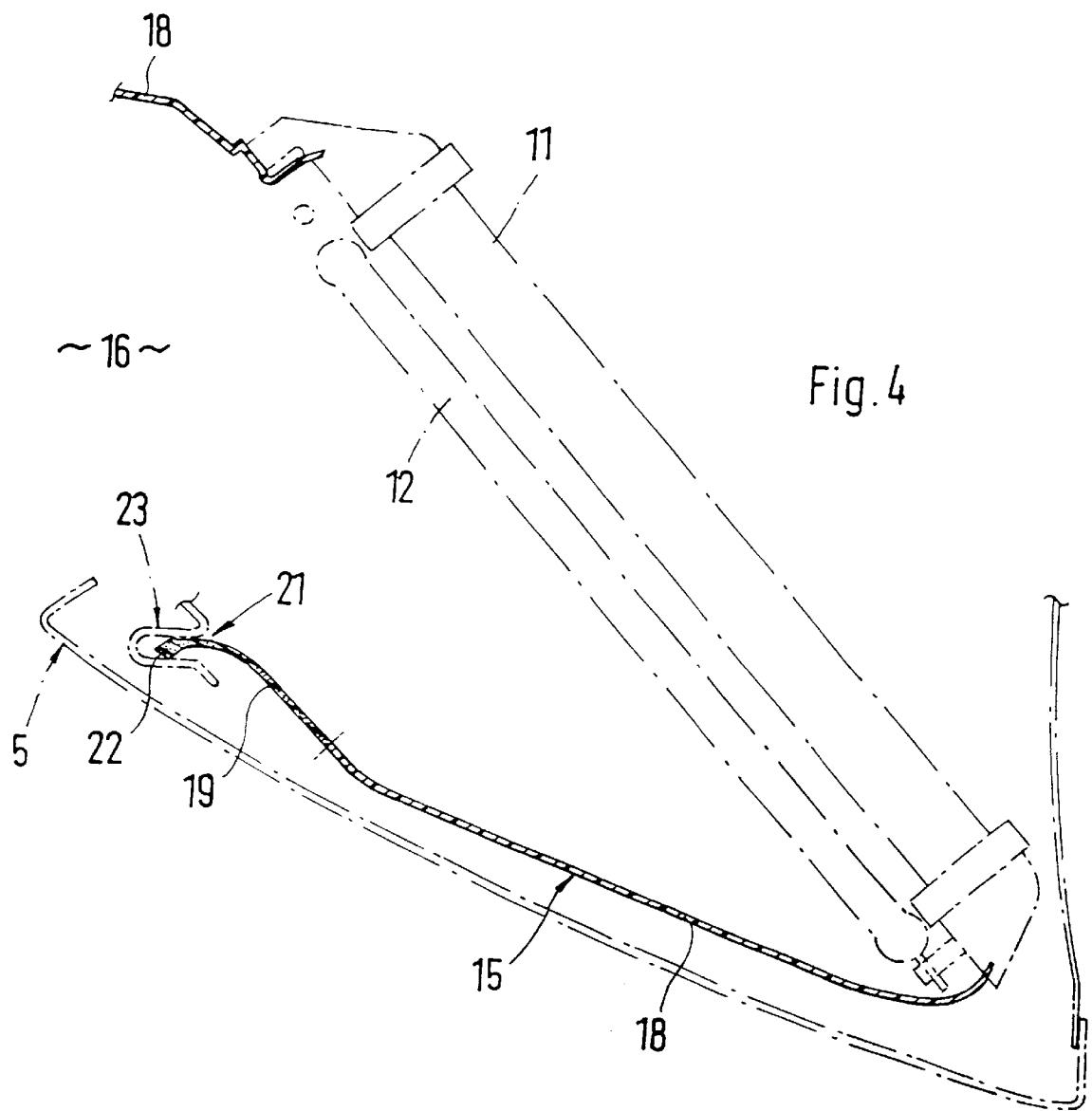
FIG. 4 is an enlarged sectional view taken along Line IV—IV of FIG. 1.

By way of two superimposed elastic bearings 28, the radiator 11 is held in position on a bent-away edge area 29 of the upright lateral wall 27 of the bracket 25 and forms a premounting unit (FIG. 2).

During the mounting of the radiator arrangement 10, in addition, a molded-on pin 30 of the radiator tank 31 of the radiator 11 is inserted by means of elastic devices 32 into a recess 33 of a body-side holder 34 so that, when the radiator arrangement 10 is mounted, a three-point bearing of the radiator 11 is provided (FIG. 7).

By way of a three-point fastening, the bracket 25 is held on the adjoining forward side member 35 and a spare wheel well 36 of the vehicle body 2 situated underneath.

Laterally on the exterior, a profiled support part 37 which extends in the longitudinal direction of the vehicle is mounted on the spare wheel well 36. Two spaced weld nuts 38 are provided on the support part 37, fastening screws 39 for holding the bracket 25 being screwed from below into the weld nuts 38 (FIG. 8).

On the forward side member 35, a transversely extending outward-projecting, threaded pin 40 is provided which is guided through a recess of an angle bracket 42 of the lateral wall 27 of the bracket 25, a nut 41 which tensions the angle bracket 42 with respect to the forward side member 35 (FIG. 9) being screwed onto the threaded pin 40.

Adjoining the radiator 11, 12, the bottom section 26 has a recess 43 through which the cooling air flowing away from the radiator 11, 12 can flow off in the downward direction to the road. In the area of the bottom section 26 as well as in the area of the lateral wall 27, the framework-type bracket 25 has reinforcing beads (FIG. 2).

For reasons of weight, a center breakthrough 44 is provided on the lateral wall 27 so that the lateral wall 27 has an approximately triangular shape. In the area adjoining the covering part 5, the air guiding housing 15 has a ring-shaped construction and has a relatively large transverse dimension and a relatively low height. By means of the ring-shaped section 20, the cooling air is guided from a center area of the vehicle to the outside to the laterally exterior radiator 11, 12.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Motor vehicle having a front dash and radiator arrangement, a duct-type air guiding housing being arranged between a front-side air supply opening of an elastic covering part that at least partially encloses a bumper support, said elastic covering part forming a vehicle end area and at least one radiator, wherein the air guiding housing is connected to the elastic covering part and the radiator, further wherein the air guiding housing is fixedly connected to the radiator and interacts with the elastic covering part situated in front only by way of a loose sliding fit, and wherein at least partial areas of the air guiding housing are made of an elastically deformable material which compensates the displacing movement.

2. Motor vehicle according to claim 1, wherein a partial area of the air guiding housing facing the elastic covering part is made of an elastically deformable plastic material, whereas a partial area of the air guiding housing facing the radiator is made of a dimensionally stable plastic material.

3. Motor vehicle according to claim 1, wherein the sliding fit is formed in areas by an approximately U-shaped receiving section of the covering part, a free end of the air guiding housing projecting into the receiving section.

4. Motor vehicle according to claim 1, wherein the sliding fit is formed in areas by a rearward-projecting flange of the covering part on whose exterior side a free end of the air guiding housing rests under prestress without being fastened.

5. Motor vehicle according to claim 1, wherein the air guiding housing is composed of two different components, one of said components facing the radiator being made of polypropylene, one of said components facing the elastic covering part being made of a thermoplastic elastomer.

6. Motor vehicle according to claim 2, wherein the air guiding housing is composed of two different components, one of said components facing the radiator being made of polypropylene, one of said components facing the elastic covering part being made of a thermoplastic elastomer.

7. Motor vehicle according to claim 3, wherein the air guiding housing is composed of two different components, one of said components facing the radiator being made of polypropylene, one of said components facing the elastic covering part being made of a thermoplastic elastomer.

8. Motor vehicle according to claim 4, wherein the air guiding housing is composed of two different components, one of said components facing the radiator being made polypropylene, one of said components facing the elastic covering part being made of a thermoplastic elastomer.

9. Motor vehicle according to claim 3, wherein the air guiding housing is composed of two different components, one of said components facing the radiator being made of polypropylene, one of said components facing the elastic covering part being made of a thermoplastic elastomer.

10. A motor vehicle having a front end radiator arrangement comprising a duct-type air guiding housing arranged between a front side air supply opening of an elastic covering part that at least partially encloses a bumper support, said elastic covering part forming a vehicle end area and at least one radiator, said air guiding housing being moveably connected to said elastic covering part and fixedly connected to said radiator, said air guiding housing being formed of at least two different materials, at least one of said materials being elastically deformable to compensate for displacing movement of said covering part.

* * * * *